United States Patent
Negre et al.

(10) Patent No.: US 7,124,586 B2
(45) Date of Patent: Oct. 24, 2006

(54) INDIVIDUAL COGENERATION PLANT AND LOCAL NETWORK

(75) Inventors: Guy Negre, Carros Cedex (FR); Cyril Negre, Carros Cedex (FR)

(73) Assignee: MDI Motor Development International S.A., Luxembourg (LU)

( * ) Notice: Subject to any disclaimer, the term of this patent is extended or adjusted under 35 U.S.C. 154(b) by 0 days.

(21) Appl. No.: 10/508,520

(22) PCT Filed: Mar. 21, 2003

(86) PCT No.: PCT/FR03/00898

§ 371 (c)(1), (2), (4) Date: Jan. 24, 2005

(87) PCT Pub. No.: WO03/081012

PCT Pub. Date: Oct. 2, 2003

(65) Prior Publication Data
US 2005/0144948 A1    Jul. 7, 2005

(30) Foreign Application Priority Data
Mar. 21, 2002  (FR) ............................. 02 03554

(51) Int. Cl.
*F01K 13/00* (2006.01)
(52) U.S. Cl. .......................... 60/645; 60/670
(58) Field of Classification Search ................ 60/645, 60/670
See application file for complete search history.

(56) References Cited

U.S. PATENT DOCUMENTS

| | | | |
|---|---|---|---|
| 4,253,300 A * | 3/1981 | Willyoung ............. | 60/39.182 |
| 4,361,204 A | 11/1982 | Earle | |
| 4,369,624 A * | 1/1983 | Hamm et al. .............. | 60/39.12 |
| 4,479,355 A * | 10/1984 | Guide et al. ................. | 60/683 |
| 4,499,722 A * | 2/1985 | Hamm et al. .............. | 60/39.12 |
| 4,667,467 A * | 5/1987 | Archer et al. ................. | 60/781 |
| 4,715,192 A * | 12/1987 | Katz ......................... | 62/323.1 |
| 5,296,799 A | 3/1994 | Davis | |
| 5,537,822 A | 7/1996 | Shnaid et al. | |
| 2002/0032092 A1 | 3/2002 | Wang | |

FOREIGN PATENT DOCUMENTS

| | | |
|---|---|---|
| EP | 1 052 559 A1 | 11/2000 |
| JP | 01190022 | 7/1989 |

* cited by examiner

*Primary Examiner*—Hoang Nguyen
(74) *Attorney, Agent, or Firm*—Connolly Bove Lodge & Hutz LLP (57) ABSTRACT

The invention concerns a cogeneration plant preferably using a compressor-alternator unit equipped with a thermal heater operating independently, by drawing compressed air supplied by one or several compression stages, which is then heated to increase its temperature and/or its pressure, then re-injected into the expansion chambers of the engine to produce the power stroke, wherein the home heating is used as device for heating the compressed air and usable in a local network where each house of a housing group (40, 40A,) is equipped with such units, interconnected (41) and controlled by a power management station (42) for the supply of electric power to each of the houses from one or more units capable of being activated successively and/or alternately depending on the overall requirements of the houses of the network.

17 Claims, 6 Drawing Sheets

INDIVIDUAL COGENERATION PLANT AND LOCAL NETWORK

The invention concerns cogeneration plants for blocks of flats or individual houses, buildings, groups of buildings, factories, and hospitals.

Cogeneration plants are efficient means of producing electric power from the same power source for example a fossil fuel such as natural gas or any other, by operating an engine, for example a gas turbine or an internal combustion engine, driving an alternator, and at the same time using the calories given off and lost by the aforesaid engine to heat the aforesaid houses or even to produce conditioned air again by using these lost calories.

The author has registered numerous patents relating to motor drive units as well as their installations, more specifically for being fitted to vehicles, using additional compressed air to give a totally clean operation in urban and suburban areas:

| WO 96/27737 | WO 97/00655 | |
| WO 97/48884 | WO 98/12062 | WO 98/15440 |
| WO 98/32963 | WO 99/37885 | WO 99/37885 |

For implementing these inventions, he has also described in his application for patent WO 99/63206, the contents of which can be referred to, a method and a device for controlling the engine piston movement making it possible to stop the piston at its top dead centre; method also described in his application for patent WO 99/20881, the contents of which can also be referred to, relating to the operating of these engines in single energy or dual-energy, in dual or triple feed modes.

The vehicles fitted with these drive units are obliged to be equipped with a compressed air refilling system with an onboard compressor driven by an electric engine as described in patent WO 98/12062, the contents of which can be referred to.

These vehicles are also obliged to have an electric starting system, for starting the engine and an alternator device for recharging the batteries and supplying the necessary onboard electric power.

Numerous starter motor alternator systems have been produced for vehicles such as Panhard and Levassor in the 1930's and Isard Glass in 1958 which were fitted with such a device known then as "dynastar", more recently numerous systems for controlling electric torque modulation are in the course of being produced commercially and electric Internal combustion dual fuel engine systems are emerging wherein the assistance of an electric engine is to be found.

To obtain good efficiency and to limit the compression rate in each cylinder, the high pressure compressors are obliged to use several stages of compression with heat exchangers between them making it possible to cool the compressed air. For illustration purposes 3 and 4 stage reciprocating compressors comprising 3 or 4 piston and cylinder units are currently used in this way in industry, the first stage carrying out, for example, the compression of the atmosphere to 8 bars then the second stage going from 8 to 30 bars then the third stage from 30 to 100 and the last stage from 100 to 300 bars. The effective capacity of each of the cylinders is reduced to compensate for the increase in pressure. The air overheated by the compression is cooled in the heat exchangers between each compression stage.

In his patent no. WO 98/32963, the contents of which can be referred to, the author describes a system for recuperating ambient thermal energy where the compressed air contained in the storage tank under extremely high pressure (for example 200 bars) and at ambient temperature (for example 20° C.), prior to its end use at a lower pressure (for example 30 bars), is expanded to a pressure dose to that required for its end use, in a variable volume system, (for example a piston in a cylinder producing work); the result of this expansion with work is that the compressed air expanded to the pressure close to that for its use is cooled to an extremely low temperature (for example minus 100° C.). This compressed air is then dispatched to a heat exchanger with ambient air making it possible to heat it, and thus increase its pressure and/or its volume, by recuperating thermal energy taken from the atmosphere; it is possible to use this system over several stages of expansion.

In his application for patent WO 99/37885, the contents of which can be referred to, he sets out a solution which makes it possible to increase the amount of available and usable energy. This solution is characterized by the fact that prior to its introduction in the combustion and/or expansion chamber, the compressed air coming from the storage tank is channelled, either directly or once it has gone through the ambient thermal energy recuperation system heat exchanger (s), and prior to its introduction in the combustion chamber, into a thermal heater where, by increasing its temperature, its pressure and/or its volume wall again increase prior to its introduction in the engine combustion and/or expansion chamber, thus significantly increasing the performances that can be achieved by the aforesaid engine.

The use of a thermal heater, despite the use of fossil fuel, has the advantage of being able to use continuous clean combustion which can be catalyzed or freed of pollution by any known means in the aim of obtaining low levels of polluting emissions.

In his patent WO 99/63206, the author sets out an operating method that makes it possible to run the engine in dual-energy mode (operating on compressed air in town and operating on air plus conventional fuel on the open roads), In the event that the compression spring chamber has been removed. The method is characterized In that the opening and closing cycle for the exhaust valve which is opened during the upward piston stroke on every revolution of the engine is changed whilst it is operating so that it opens during the upward piston stroke on every second revolution and, in that, the engine is at the same time fitted with an intake for air and fuel such as petrol, diesel or any other, making it possible to introduce a load of air-fuel mixture which is drawn in during the downward piston stroke then compressed in the expansion chamber which then becomes a combustion chamber, wherein the mixture is burnt then expanded by producing work by driving back the piston, and then driven back to the exhaust pipe according to the standard 4 stroke engine cycle. In this same patent, he also sets out a solution for triple mode operating characterized in that the engine operates either using compressed air without heating, for example pollution free urban circulation, or using compressed air heated by external-combustion in a thermal heater powered by a traditional fuel for example in suburban circulation with a low level of pollution, or in highway traffic, with internal combustion with an intake of air and petrol (or any other fuel) making it possible to introduce a load of air-fuel mixture which is drawn in during the downward piston stroke then compressed in the expansion chamber which thus becomes a combustion chamber, wherein the mixture is burnt then expanded by producing work and released into the atmosphere according to the standard 4 stroke engine cycle.

The three operating modes described above can be used separately or together, whatever the opening and closing modes for both the exhaust and Intake pipes, the procedures and devices controlled by electronic, electromechanical, mechanical or other devices for transferring from one mode to another, the fuels or gases used, without changing the principle of the invention described in the aforesaid patent in any way.

Likewise the intake and exhaust valves can advantageously be controlled by electric, pneumatic or hydraulic systems controlled by an electronic computer according to the operating parameters.

The inventor has also registered patent no. WO 00/07278, the contents of which can be referred to, relating to a fuel-less emergency electric power generator coming from the previously described technologies.

In his application for patent FR 01/13798, the author describes a compressor-alternator unit characterized by the means implemented taken altogether or separately, and more specifically:

- in that the diameter of the pistons is of a two-stage design comprising a large diameter crown sliding in a cylinder called engine to guarantee the engine function during the expansion followed by the releasing of the exhaust and of which the aforesaid crown is extended into a smaller diameter second stage piston called compression to guarantee the function of compressing the compressed air stared in the high pressure tank.
- in that the second stage pistons are used for the expansion with work function in the ambient thermal energy recuperation system.
- in that the means of switching and interaction are Installed between the different cylinders making it possible to inactivate the engine function during the compression operation, and/or to inactivate the compressor function during the engine operation, and/or as well, to activate the ambient thermal energy recuperation function during the engine operation.
- in that heat exchangers are installed between each compression and/or, thermal energy recuperation expansion cylinder for cooling the compressed air going through them during the compression operation, and/or for heating it during the ambient thermal energy recuperation operation.
- in that the engine flywheel comprises the means attached to its periphery to make it possible to produce an electronically-driven electric engine for driving the unit in its compressor function powered by the domestic electric power networks (220V).
- in that the electric engine is bi-directional and can be used as a generator or an alternator.

According to a variation of the aforesaid invention, the alternator thus produced makes it possible to start the unit in its engine function by causing it to rotate for at least one engine revolution to make it possible to bring the engine to its compressed air injection position, and/or to take part on an ad hoc basis in Increasing the engine torque, or again to produce the electric power during the continuous operation to produce the onboard electric power, or to be used as a decelerator by causing opposing torque during this production of electric power.

Whilst the unit is being used in compression mode using notably the energy supplied by the domestic network, and according to another aspect of the invention, the electric engine is characterized in that its rotation speed is variable, by using a high speed whilst the tank Is empty and the torque requested from the compressor drive motor is low to achieve a lower rotation speed that then resembles the shape of the electric engine torque curve.

The electric engine installed on the flywheel can make use of the well-known permanent magnet motor techniques, the aforesaid magnets being fixed to its rotor (which is in fact the engine flywheel) even though the electromagnet coils are mounted almost concentrically, fixed radially or axially, to a suitable integrated casing for the compressor-alternator unit block or even the technologies of variable reluctance motors or other devices known to those skilled in the art, without changing the principle of the invention in any way.

The compressor-alternator unit according to the aforesaid invention is preferably fitted with an ambient thermal energy recuperation system such as described by the author in patent WO 98/32963 where the compressed air contained in the storage tank under extremely high pressure, for example 200 bars, and at ambient temperature, for example 20 degrees, prior to its end use at a lower pressure for example 30 bars, is expanded to a pressure close to that required for its end use, in a variable volume system, for example a piston in a cylinder, producing work which can be recuperated and used by all known mechanical, electric, hydraulic or other means. The result of this expansion with work is that the compressed air expanded to the pressure dose to that for its user is cooled to an extremely low temperature, for example minus 100° C. This expanded compressed air at its use pressure, and at a very low temperature is then dispatched to a heat exchanger with ambient air. It will be heated to a temperature close to the ambient temperature, and will thus increase its pressure and/or its volume, by recuperating thermal energy taken from the atmosphere. This operation can be repeated several times in several stages. The ambient thermal energy recuperation system according to the invention is characterized in that the compression cylinders and pistons are used to carry out these successive expansions and in that the heat exchangers used for cooling the air whilst it is used in the compressor are also used for heating the air expanded beforehand and is also characterized in that provision is made for the means to divert so as to successively use the different stages of the recuperation cylinders, the volumes of which are greater and greater, as the pressure reduces in the storage tank so as to allow suitable expansions.

The compressor-alternator unit, according to the aforesaid invention is, again preferably, fitted with a thermal heating system as described by the author in another patent WO/99/37885, where he sets out a solution which makes it possible to increase the amount of available and usable energy. This solution is characterized by the fact that prior to its introduction in the combustion and/or expansion chamber, the compressed air coming from the storage tank is channelled, either directly or once it has gone through the ambient thermal energy recuperation system heat exchanger, and prior to Its Introduction in the expansion chamber, into a thermal heater where, by increasing its temperature, its pressure and/or its volume will again increase prior to its introduction in the combustion and/or expansion chamber, thus significantly increasing the performances that can be achieved by the engine.

The use of a thermal heater has the advantage of being able to use continuous clean combustion which can be catalyzed or freed of pollution by any known means in the aim of obtaining low levels of polluting emissions.

The thermal heater can use a fossil fuel such as petrol, diesel or even GPL GNV gas for energy, thus making it possible to achieve an external combustion dual-energy operation where a burner will cause a rise in temperature.

According to another variation of the invention, the heater advantageously uses the thermochemical processes based on absorption and desorption processes, such as those used and described for example in patents EP 0 307297 A1 and EP 0 382586 B1, these processes using the transformation by evaporation of a fluid for example liquid ammonia to a gas reacting with salts like calcium, manganese or any other chloride, the system operates like a thermal battery where in a first phase the evaporation of the store of ammonia contained in an evaporator on the one hand produces cold and on the other a chemical reaction in the reactor containing the salts which gives off heat, when the store of ammonia is exhausted, the system can be refilled in a second phase by a heat input in the reactor which reverses the reaction where the ammonia gas breaks down from the chloride, and returns to a liquid state via condensation.

The application according to the aforesaid invention is characterized in that the thermochemical heater thus described uses the heat produced during phase I to increase the pressure and/or the volume of the compressed air coming from the high pressure storage tank, prior to its introduction in the master cylinder expansion chamber.

During phase 2, the system is regenerated by the input of the heat given off by the exhaust pipes from the various stages of the compressor during the compressor operation for refilling the main high pressure storage tank.

According to a variation of the aforesaid invention, the compressor-alternator unit is equipped with a burner, or any other, type thermal heater and a thermo-chemical heater as previously cited which can be used at the same time or successively during phase 1 of the thermo-chemical heater where the burner type thermal heater will make it possible to regenerate (phase 2) the thermo-chemical heater when the latter is empty by heating its reactor as the unit operation continues with the use of the burner type heater.

According to another embodiment of the aforesaid invention, the compressor-alternator unit equipped with a thermal heater operates independently, without using the high pressure compressed air contained in the storage tank, by drawing compressed air supplied by one or several compression stages according to the required work pressures; this compressed air is then heated in the heating system where its temperature will increase resulting in the increase of its volume and/or its pressure, then re-injected into the expansion chambers of the master cylinders making it possible for the unit to operate by expanding and producing the power stroke.

According to another variation of the embodiment above, and when the unit is operating independently, the expansion cylinder exhaust air is diverted to the thermal heater either directly, or through one or more stages of compression where its temperature will increase resulting in the increase of its pressure and/or its volume, then re-injected into the expansion chambers of the expansion cylinders making it possible for the unit to operate by producing the power stroke. A pressure relief valve In the exhaust system, prior to the thermal heater, makes it possible to control the aforesaid pressure and release any excess air into the atmosphere.

According to a variation of the embodiment above, part of the compression air can be diverted and used and/or other stages of the compressor are used to refill the main tank whilst the engine is operating independently as described above.

The compressor-alternator unit thus equipped operates in dual-energy mode by using in town for example, the pollution free operation with the compressed air contained in the high pressure storage tank, and on the open roads, again for the independent operating example with its thermal heater powered by a fossil energy, whilst refilling the high pressure storage tank from one or more of its compression stages.

The compressor-alternator unit operates with four sources of energy which can be used jointly or separately during its use, according to the performances sought after or required.

Compressed air energy contained in the high pressure storage tank is the main source and is notably used to give a totally clean operation in urban areas.

Thermo-chemical energy is used to increase the performances and the autonomy of use by pollution free operating.

Fossil energy for the burner type heater which is used for:
making it possible for the unit to operate independently,
increasing performances and autonomy of use by operating with compressed air injection,
refilling the tank whilst making it possible for the unit to operate,
regenerating the thermo-chemical heater when the latter is also empty.

Electric power energy which is used:
notably for driving the compressor during the refilling of the compressed air tank whilst the vehicle is connected to the 220 V domestic network,
for starting the unit powered by the battery,
for increasing the engine torque where necessary on an ad hoc basis.

The compressor-alternator unit described in the aforesaid application is also equipped with a device for controlling the piston movement characterized in that the pins of opposing pistons, and the fixed point of the pressure lever are almost aligned along the same axis, and characterized in that the pin of the control rod connected to the crankshaft is positioned not on the pin common to the hinged arms but on the arm itself between the common pin and the fixed point or pivot. For that reason the lower arm and its symmetry depict an arm at one with the pivot, or fixed point, almost in its centre and with two pins at each of its free ends connected to the opposing pistons.

The application for patent 000/4555 relates to the dialogue between the electric or electronic units of a mobile or fixed installation and more specifically of motor vehicles.

The applicant acquired the rights relating to the aforesaid application registered with INPI under the no. 0701.02 125132 relating to an independent dialogue system which intends to simplify existing systems whilst controlling the systems by measuring voltages, currents, load presence, as well as faults.

The aforesaid system is characterized in that each unit comprises:
a radio transceiver
a management and independent dialogue microprocessor
a dc power supply
and communicates with the other units and more specifically with the control unit by modulated radio waves, for example by ASK, FSK or any other modulation.

This provision thus makes it possible to communicate the different switching commands to the different electric or electronic elements of an installation, at the same time as it makes it possible to take the physical measurements which it then uses to detect any operating anomaly for the element in question, and to transmit them to the other units.

Each unit in the radio receiving and/or transmitting circuit is modulated in frequency and has an individual identification code. The signal to be transmitted is constructed by a microprocessor contained in each unit; the signal is then amplified by an electronic circuit prior to its propagation by the antenna to all the other units.

The microprocessor constructs analog radio signals to be transmitted and analyzes the radio signals received and constructs a digital frame which is then decoded so as to obtain various data such as the code of the transmitting unit, the code of the receiving unit, the authorization command, the different data and parameters and the key for this frame.

The digital frame is received by all the units and the microprocessors for the aforesaid receiving units compare their individual identification code to that contained in the frame, so that the unit in question is the only one to carry out the command issued.

If the digital frame received is intended for this unit, the internal microprocessor for said unit looks to see whether it is valid. This means that the microprocessor calculates a digital key using all the bits contained in the frame received and compares it with the key contained in the frame itself. If the result gives the value zero, then the frame received does not contain a transmission error. At this stage, the microprocessor carries out the command contained in the received frame and sends a confirmation message to the transmitting unit.

For transmitting data, the unit constructs, through its internal microprocessor, a digital frame then transforms it with a carrier wave to an analog signal. The analog signal obtained in this way is amplified then propagated by the antenna to all the other units and notably to the command or control unit. Advantageously, the dialogue system radio link is set up via a conductor interconnecting all the units thus making it possible to avoid all interference.

The digital frame constructed by the microprocessor contains the code of the receiving unit, the code of the transmitting unit, the command, the data, the parameters as well as the frame key. This coding mode means that each unit knows who the transmitter is and who the receiver is.

This invention relates to the use of and the operating procedures for compressor-alternator units and communication systems such as that described above to obtain particularly efficient cogeneration plants.

The individual cogeneration plant according to the invention uses the compressor-alternator unit equipped with a thermal heater operating independently, without using the high pressure compressed air contained in the storage tank, by drawing compressed air supplied by one or several compression stages according to the required work pressures; this compressed air is then heated in the heating system where its temperature will increase resulting in the increase of its volume and/or its pressure, then re-injected into the expansion chambers of the master cylinders making it possible for the unit to operate by expanding and producing the power stroke; it is characterized in that the home heating in question is used as a thermal heater making it possible to operate the engine which supplies electric power by using the alternator integrated on the flywheel of the aforesaid unit.

The aforesaid home heating can be either gas or coal or biomass or any other firing without changing the principle of the invention in any way.

According to a variation of the invention, the cogeneration plant uses advantageously the thermo-chemical processes based on absorption and desorption processes, such as those described above to make it possible to operate the plant whilst the home heating is inactivated.

According to a variation of the invention, the compressor-alternator unit is equipped with a burner, or any other, type thermal heater and a thermo-chemical heater as previously cited which can be used at the same time or successively during phase 1 of the thermochemical heater where the burner type thermal heater will make it possible to regenerate (phase 2) the thermo-chemical heater when the latter is empty by heating its reactor with the use of the burner type heater as the unit operation continues.

According to a variation of the invention, the compressor-alternator unit is equipped with a high pressure compressed air tank making it possible during a power failure to operate the plant as an emergency electric power generator and to produce the electric power for the home.

According to a variation of the invention, each house in a group of houses comprising for example a urban housing estate is equipped with an individual cogeneration plant according to the invention and each cogeneration plant is linked to the others by an electrical conductor constituting a local network; a power management station is installed, making it possible to manage the supply of electric power to each of the houses grouped together in this way from one or more units capable of being activated successively or alternately depending on the overall requirements of the houses of the network.

Advantageously, the power management station according to the invention is equipped with the communication system as described previously on pages 8 to 11.

So as to illustrate the local network according to the invention, and as an example, we shall consider that 10 houses on the same housing estate are each equipped with a 15 Kw cogeneration plant accounting for a group total of 150 Kw. During the off-peak period at night for example, where the average electric power consumption for each house is for example 1 Kw, making a total of 10 Kw, a single cogeneration plant is activated by the power management station and supplies electric power to all the houses in the area network.

The station will automatically account for the operating hours of each of the aforesaid plants to apportion their use and will activate the plants one after the other successively and/or alternately according to requirements.

The station according to the invention is equipped with metering facilities making it possible to apportion each user with his/her exact costs for their expenditure of energy.

In the morning as each house requires electric power, a second cogeneration plant then a third, and so on, will be activated by the station to make it possible to meet the requirements of the housing estate.

In winter, as heating requirements can be different for each house, the station will operate the cogeneration plants of the houses using heating as a matter of priority.

In addition, the installation of the cogeneration plant in a local network according to the invention can also be achieved in a building where each dwelling is equipped with individual heating where the internal network for the building will be managed in the same way as houses from the local network as described above.

In addition, the cogeneration plants in a local network can be installed in groups of buildings each having a central heating plant where each building will be equipped with a high-powered cogeneration plant producing the electric power for its own building and/or other buildings, where the power management station will s manage the operation of the network in the same way as previously described for individual houses.

According to a variation of the invention a high-powered cogeneration plant for example of more than 600 cv used either in a single building or in a network of a group of buildings is advantageously replaced by a group of low-powered cogeneration plants for example 12×50 cv units linked and interconnected by any means and managed by a power management station such as described above where each of the units in this group will then be activated successively one after the other according to the energy requirements of the building.

Other objects, advantages and features of the invention will become apparent upon reading the nonlimiting description of a number of embodiments which are given with reference to the appended drawings in which.

Figure 1:
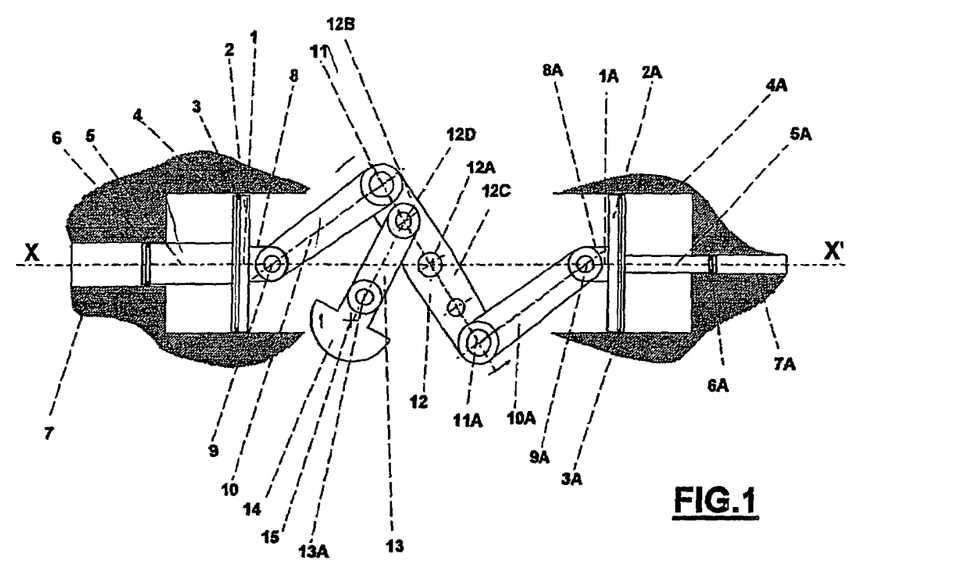
FIG. 1 is a diagrammatic depiction in cross section of the moving elements of the compressor-alternator unit at its bottom dead centre.
Figure 2:
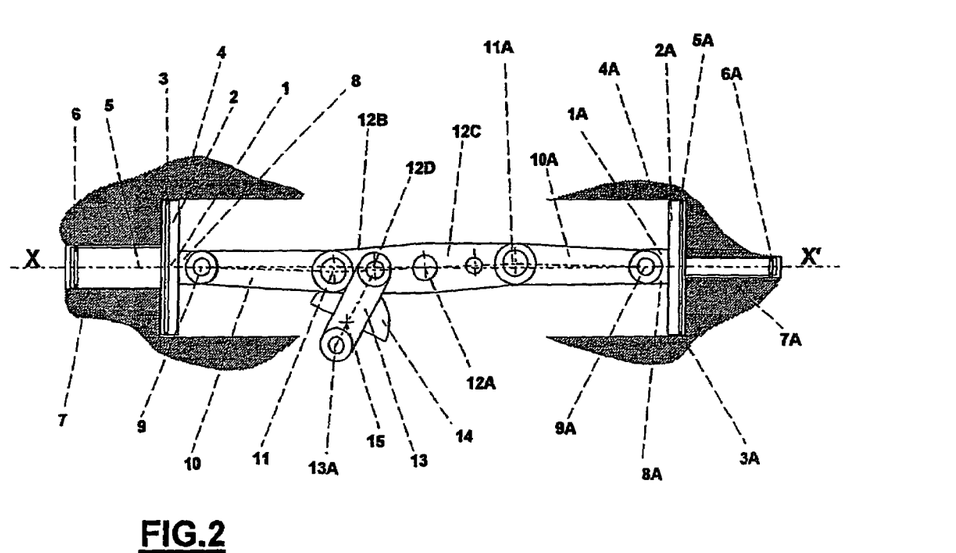
FIG. 2 is a depiction in cross section of the same moving elements of the unit at its top dead centre.

FIGS. 1 and 2 are diagrammatic depictions in cross section of the architecture for the moving elements of the plant according to the invention comprising two almost opposing pistons and cylinders on the same XX' axis where it Is possible to see the two stage pistons 1 and 1A, each comprising a first engine stage constituted by a large diameter crown 2 and 2A equipped with piston ring seals 3 and 3A and sliding into their master or expansion cylinder 4 and 4A, and a second concentric compression stage 5 and 5A, constituted by a type of smaller diameter pin also equipped with piston ring seals 6 and 6A, and sliding into the compression cylinders 7 and 7A, each piston also comprising bosses 8 and 8A making it possible to connect them via a pin, called the piston pin, 9 and 9A to the crank piston rod system via the connecting rods 10 and 10A, themselves connected via a common pin 11 and 11A to the two free ends of an arm 12 mounted so that it swings, almost in its centre, on a fixed pin 12A, located almost along the axis of the cylinders X,X'; the fixed pin 12A thus divides the arm 12 into two half-arms 12B and 12C. On one of the half-arms here the 12B, a control rod 13 connected to the crankpin 13A of a crankshaft 14 turning on its pin 15 is attached via a pin 12D. During the rotation (direction of the arrow) of the crankshaft, the control rod 13 applies a force to the pin 12D, causing the swinging arm 12 to move, thus allowing the pistons 1 and 1A to travel along the axis of the cylinders 4, 4A, 6, 6A, or even the axis XX' of the bottom dead centre (FIG. 1) to the top dead centre (FIG. 2), and on its backstroke, it transmits the forces applied to the pistons 1 and 1A during the power stroke from the top dead centre to the bottom dead centre to the crankshaft 14 thus generating the rotation of the aforesaid crankshaft. When the pistons are at their top dead centre (FIG. 2) the connecting rods 10 and 10A and the swinging arm 12 are aligned along axis XX'. In this position the distance between the crankpin 13 A of the crankshaft and the axis XX' is almost identical during part of the rotation of the crankshaft thus controlling the travel of the pistons which remain stopped at their top dead centre position for a significant period of time.

Figure 3:
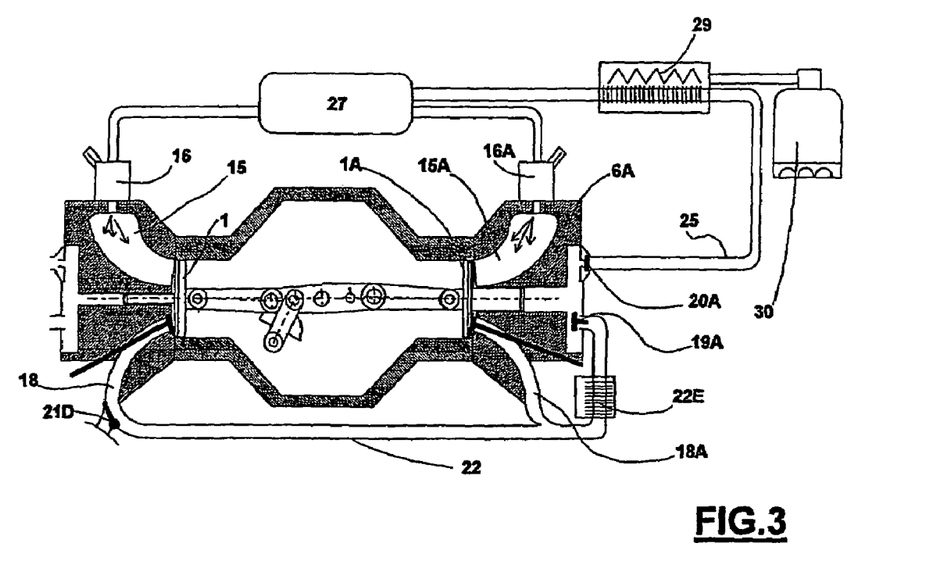
FIG. 3 is a diagrammatic depiction at its top dead centre, of the compressor-alternator unit according to the invention equipped with a thermal heater and designed to operate independently.

FIG. 3 depicts a compressor-alternator unit equipped with one of the possible attachments for independent operating without a high pressure compressed air storage tank, where it is possible to see the unit according to the Invention, fitted with its heater 29 powered by fossil energy from a gas bottle 30 and wherein the exhaust pipes 18 and 18A are connected via the pipe 22 to the inlet valve 19A of the compression cylinder 6A whilst the exhaust valve 20A of the aforesaid compression cylinder 6A is connected to the buffer capacity 27 via pipe 25 and the thermal heater 29.

Figure 4:
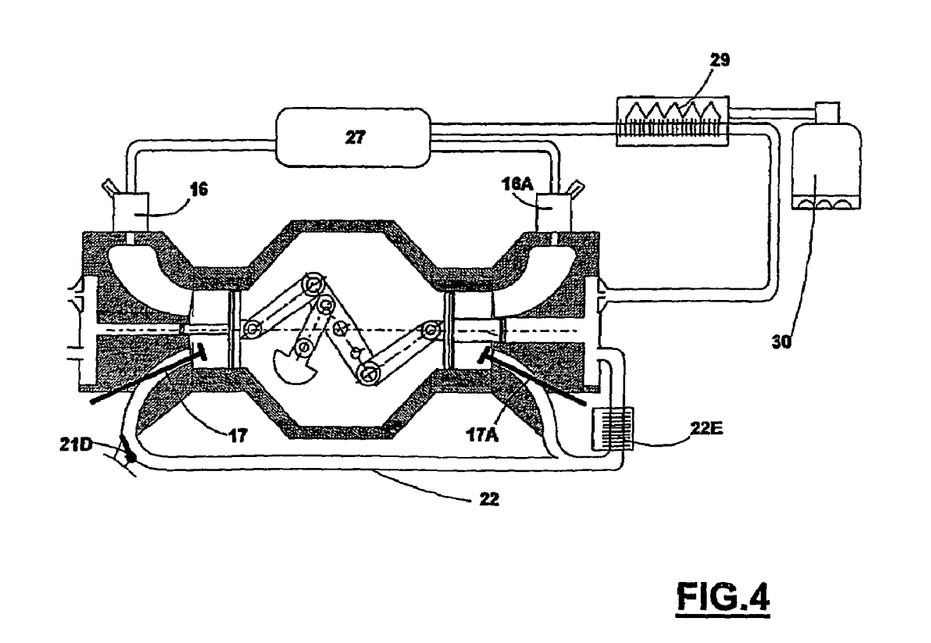
FIG. 4 depicts the same engine at its bottom dead centre.

When the piston is at the top dead centre, FIG. 3, the air injectors are controlled and the pressure increases in the expansion chambers 15 and 15A, the pistons 1 and 1A are then driven back to their bottom dead centre by carrying out the power stroke, during the upward stroke of the pistons, FIG. 4, the exhaust valves 17 and 17A are open and the expanded air is recompressed and driven back to the compression cylinder 6A via the exhaust pipes 18, the pipe 22, the radiator 22E and the inlet valve of the compression cylinder 6A, the air will penetrate into the cylinder 6A as soon as the pistons reach the top dead centre whilst the compressed air in the compression cylinder 6A from the previous cycle is pushed back to the heater 29 where its pressure and/or its volume will be increased and introduced into the buffer capacity 27 so as to supply the injectors 16 and 16A. A pressure relief valve 21D in the exhaust system makes it possible to control the inlet pressure in the compression cylinder 6A and release any excess compressed air into the atmosphere.

Figure 5:
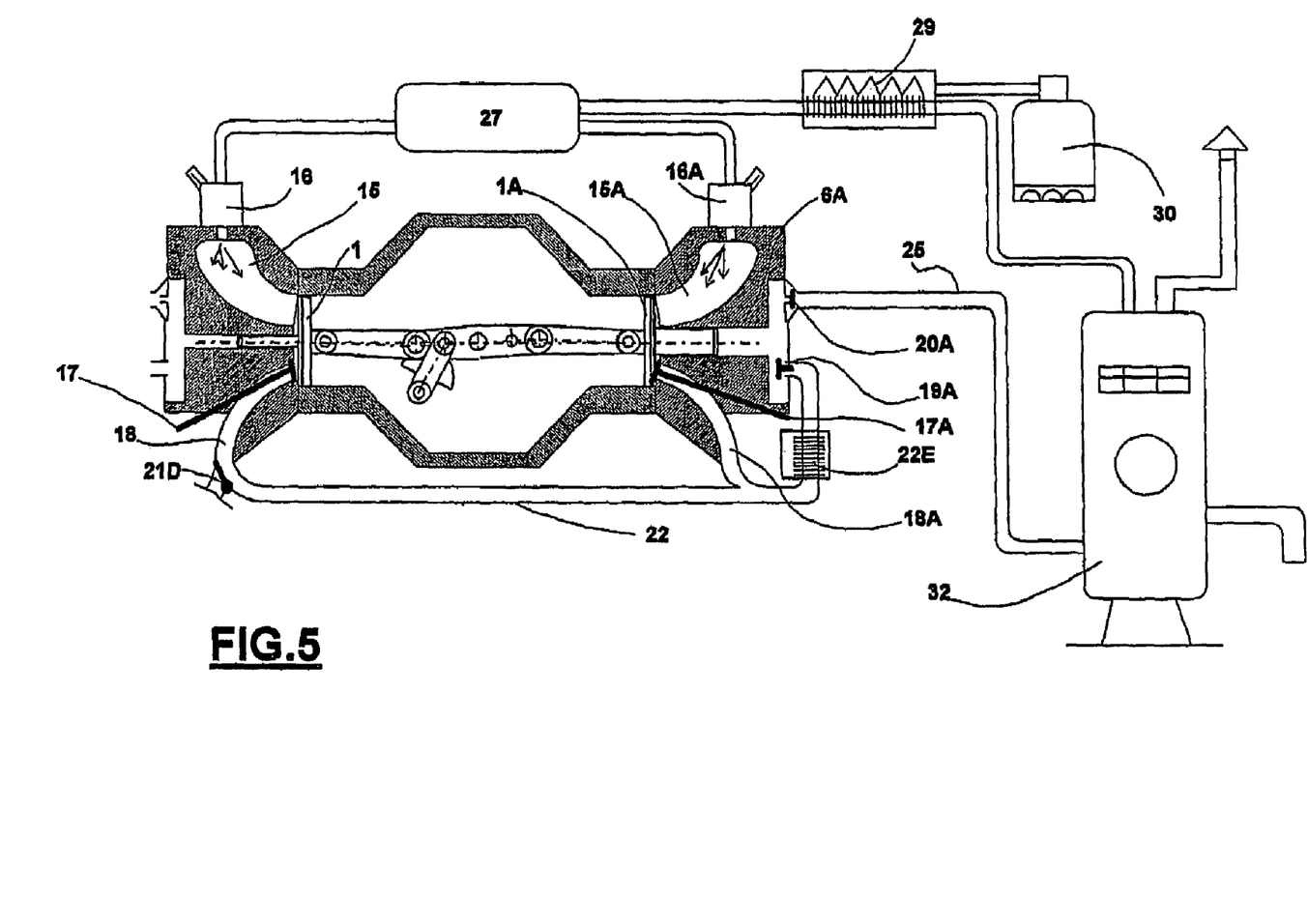
FIG. 5 depicts the same unit where the device for heating constitutes the central heating boiler from a house.
Figure 6:
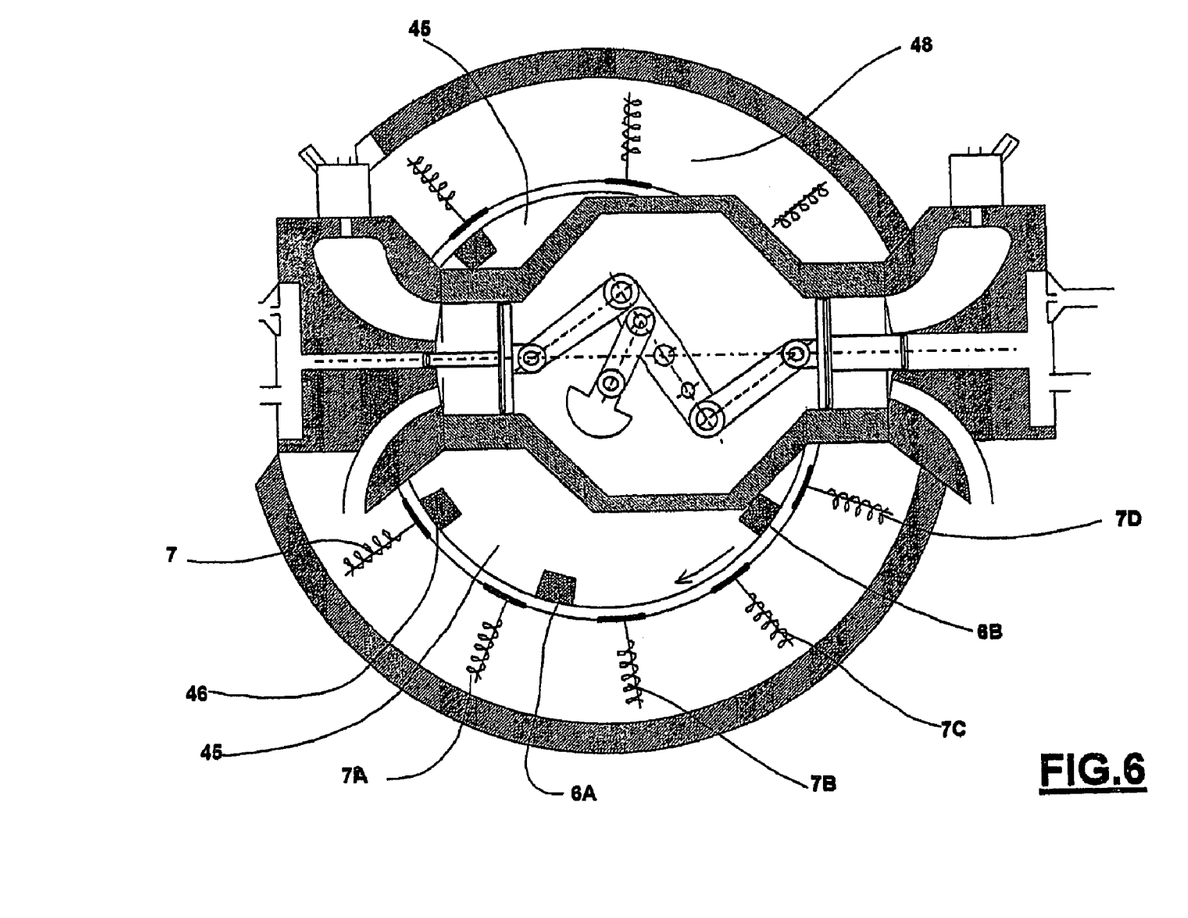
FIG. 6 is a diagrammatic depiction of the unit equipped with its means of producing electric power.

FIG. 5 is a highly diagrammatic depiction of the cogeneration plant according to the invention using an individual central heating boiler from a house as its device for heating where it is possible to see the compressor-alternator unit equipped with one of the possible attachments for independent operating without a high pressure compressed air storage tank, where it is possible to see the unit according to the invention, wherein the exhaust pipes 18 and 18A are connected via pipe 22 to the inlet valve 19A of the compression cylinder 6A whilst the exhaust valve 20A of the aforesaid compression cylinder is connected to the buffer capacity 27 via the pipe 25 and the individual central heating boiler from the house 32.

When the piston is at the top dead centre, FIG. 5, the air injectors are controlled and the pressure increases in the expansion chambers 15 and 15A, the pistons 1 and 1A are then driven back to their bottom dead centre by carrying out the power stroke, during the upward stroke of the pistons, the exhaust valves 17 and 17A will be open and the expanded air will be recompressed and driven back to the compression cylinder 6A via the exhaust pipes 18, the pipe 22, the radiator 22E and the inlet valve of the compression cylinder 6A, the air will penetrate into the cylinder 6A as soon as the pistons reach the top dead centre whilst the compressed air in the compression cylinder 6A from the previous cycle is pushed back to the central heating boiler 32, where its pressure and/or its volume will be increased and introduced Into the buffer capacity 27 so as to supply the injectors 16 and 16A. A pressure relief valve 21D in the exhaust system makes it possible to control the inlet pressure in the compression cylinder 6A and release any excess compressed air into the atmosphere.

The alternator used for generating the current for the plant is not shown in FIGS. 1 to 5, FIG. 6 diagrammatically depicts a plant such as those described in the preceding figures and equipped with its alternator 48 making it possible to produce the electric power where the flywheel 45 comprises the permanent magnets 46, 46A, 46B, which during the rotation will travel past the electromagnets 47, 47A, 47B, 47C, 47D, and produce electric power which is the reason for the described cogeneration plant operation.

Figure 7:
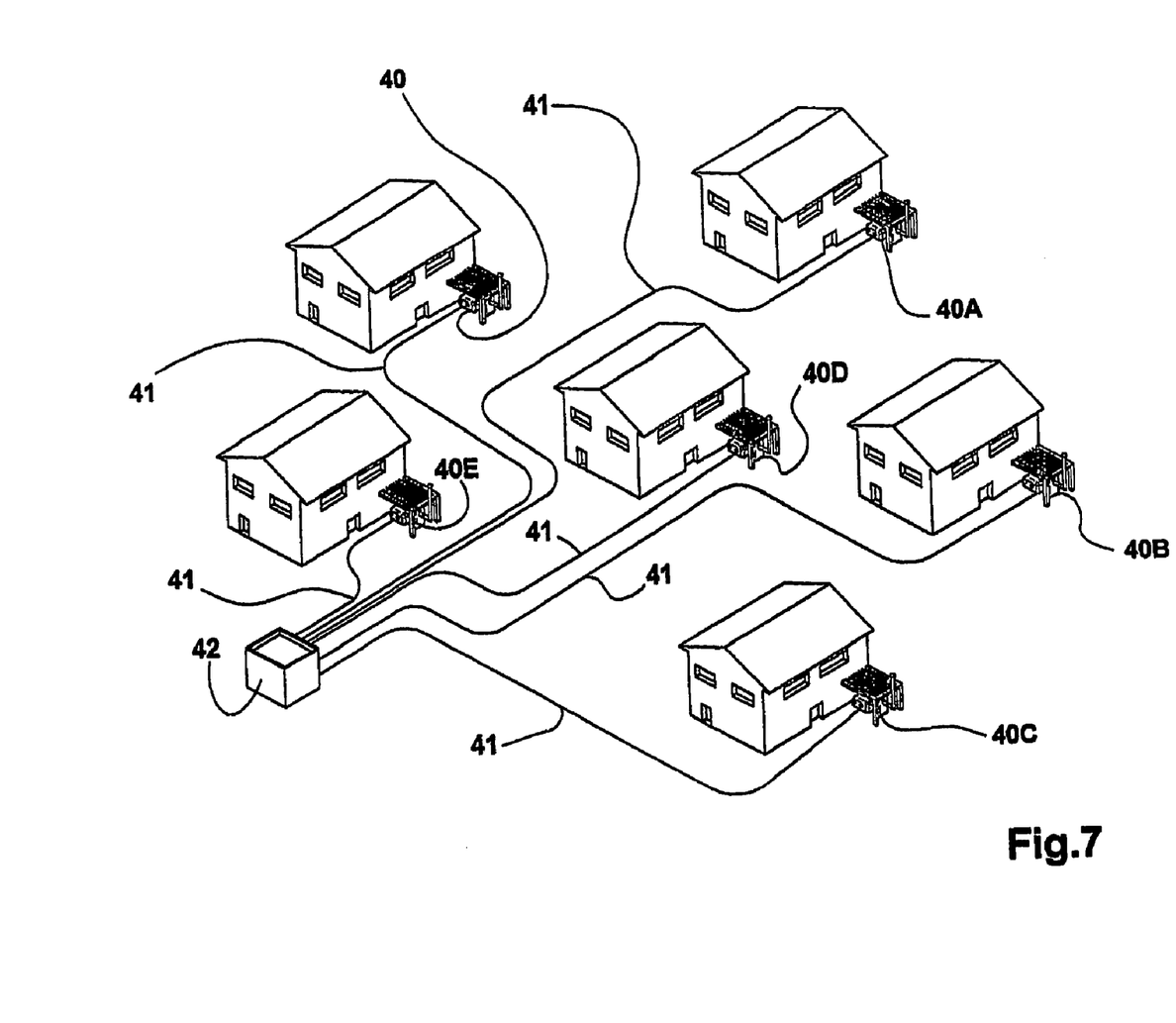
FIG. 7 depicts a group of houses connected to the area network.

FIG. 7 depicts a local network where it is possible to see a group of 6 houses constituting for example an urban housing estate where each house is equipped with a cogeneration plant according to the invention 40, 40A, 40B, 40C, 40D, 40E, and each cogeneration plant is connected to the others by an electric conductor 41 constituting a local network; a power management station 42 is installed to make it possible to manage the supply of electric power to each of the houses grouped together in this way from one or more units capable of being activated successively or alternately depending on the overall requirements of the houses of the network.

Figure 8:
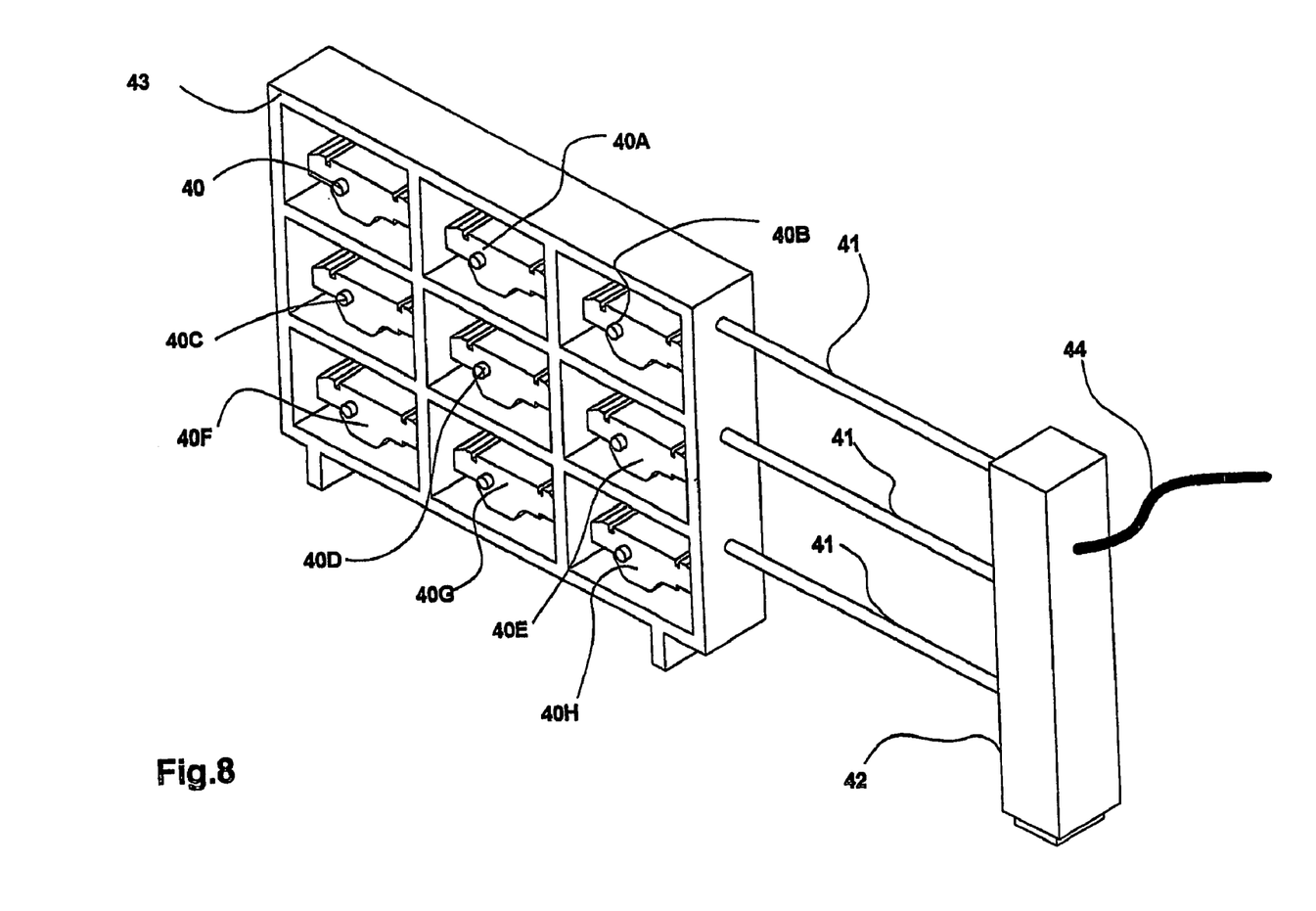
FIG. 8 depicts a high-powered cogeneration plant constituted by a group of 9 units or low-powered cogeneration plants according to the invention.

FIG. 8 depicts a high-powered cogeneration plant for example 450 cv constituted according to the invention of 9 units of small 50 cv cogeneration plants such as described above, 40, 40A, 40B, 40C, 40D, 40E, 40F, 40G, 40H, and each having their alternator, not shown, their supply and thermal heater system mounted in a rack 43, connected by electric conductors 41 to a power management station 42 itself connected to the electric power supply for the house via suitable means 44 or other installation so that the station will start up and activate the units of this plant one after another as and when electric power is required.

The number of cogeneration units constituting the plant Is by no means restricted to the examples described above and makes it possible to adjust the overall power to meet requirements whatever they are by playing with the power of each unit, and the number of these units.

The invention is not restricted to the embodiments described and depicted: the equipment, the means of control, the devices described can vary subject to them being equivalent and producing the same results, likewise the number of dwellings and/or houses included In the local network, their distances apart and the power levels installed, without changing the invention which has just been described in any way.

Although more specifically adapted to the use of the designated and described compressor-alternator units as well as the communication system, it will be possible to use various operating motors and different energy management systems without changing the principle of the invention which has just been described in any way.

The invention claimed is:

1. A cogeneration plant comprising:
a compressor-alternator unit comprising a compressor and an alternator, said compressor-alternator unit being arranged to operate independently, by drawing compressed air supplied by one or more compression stages; and
a heating system arranged to heat compressed air from the compressor so as to increase the volume and/or temperature of the compressed air, and arranged to re-inject the compressed air into expansion chambers of master cylinders of said compressor, wherein:
said heating system comprises a heating unit for a house, said heating unit enabling operation of the compressor; and
said alternator supplies electric power to the house.

2. A cogeneration plant according to claim 1, wherein the alternator is integrated on a flywheel of said compressor-alternator unit.

3. A cogeneration plant according to claim 1, wherein the compressor-alternator unit is equipped with a compressed air tank arranged to operate the cogeneration plant during a power failure as an emergency electric power generator and to produce electric power for the house.

4. A local network comprising a power management station, a group of houses and cogeneration plants arranged such that each one of said cogeneration plants is dedicated to one of said houses, wherein:
each one of said cogeneration plants comprises:
a compressor-alternator unit comprising a compressor and an alternator, said compressor-alternator unit being arranged to operate independently, by drawing compressed air supplied by one or more compression stages; and
a heating system arranged to heat compressed air from the compressor so as to increase the volume and/or temperature of the compressed air, and arranged to re-inject the compressed air into expansion chambers of master cylinders of said compressor, wherein:
said heating system comprises a heating unit for an associated one of said houses, said heating unit enabling operation of the compressor; and
said alternator supplies electric power to the associated one of said houses;
each one of said cogeneration plants is linked to other ones of said cogeneration plants by an electrical conductor; and
said power management station enables said cogeneration plants to be activated successively and/or alternately to supply electric power to said group of houses based on overall requirements of said group of houses.

5. A local network according to claim 4, comprising a radio receiving and/or transmitting circuit, said radio receiving and/or transmitting circuit comprising electric or electronic units and a control unit, wherein:
each of said electric or electronic units comprises a radio transceiver, a management and independent dialogue microprocessor and a DC power supply;
said electric or electronic units are arranged to communicate with each other and the control unit via modulated radio waves over a dialogue system radio link established by a conductor interconnecting each of said electric or electronic units and said control unit so as to avoid interference;
each of said electric or electronic units and the control unit are modulated in frequency and have an individual identification code, and a signal to be transmitted by one of said electric or electronic units or the control unit is amplified by an electronic circuit prior to propagation by an antenna to said control unit or other units among said electric or electronic units;
each microprocessor is arranged to construct analog radio signals to be transmitted, analyze received radio signals and construct a digital frame which is decoded so as to obtain various data including:
the identification code of a transmitting unit and a receiving unit among said electric or electronic units and said control unit;
an authorization command;
data and parameters for the digital frame; and
a key for the digital frame; and
said receiving unit is arranged to carry out a command contained in a received digital frame and send a confirmation message to said transmitting unit through the microprocessor of the receiving unit, and the microprocessor of the receiving unit thereafter constructs a confirmation digital frame which is amplified and then propagated by the antenna of the receiving unit to the transmitting unit and remaining ones of said electric or electronic units.

6. A local network comprising a power management station, a block of flats, and cogeneration plants arranged such that each one of said cogeneration plants is dedicated to one of said flats, wherein:

each one of said cogeneration plants comprises:
 a compressor-alternator unit comprising a compressor and an alternator, said compressor-alternator unit being arranged to operate independently, by drawing compressed air supplied by one or more compression stages; and
 a heating system arranged to heat compressed air from the compressor so as to increase the volume and/or temperature of the compressed air, and arranged to re-inject the compressed air into expansion chambers of master cylinders of said compressor, wherein:
  said heating system comprises a heating unit for an associated one of said flats, said heating unit enabling operation of the compressor; and
  said alternator supplies electric power to the associated one of said flats;

each one of said cogeneration plants is linked to other ones of said cogeneration plants by an electrical conductor; and said power management station enables said cogeneration plants to be activated successively and/or alternately to supply electric power to said block of flats based on overall requirements of said block of flats.

7. A local network comprising a power management station, a block of buildings containing a plurality of flats, and high-powered cogeneration plants arranged such that each one of said cogeneration plants is dedicated to one of said buildings, wherein:

each one of said cogeneration plants comprises:
 a compressor-alternator unit comprising a compressor and an alternator, said compressor-alternator unit being arranged to operate independently, by drawing compressed air supplied by one or more compression stages; and
 a heating system arranged to heat compressed air from the compressor so as to increase the volume and/or temperature of die compressed air, and arranged to re-inject the compressed air into expansion chambers of master cylinders of said compressor, wherein:
  said heating system comprises a heating unit for an associated one of said buildings, said heating unit enabling operation of the compressor; and
  said alternator supplies electric power to the associated one of said buildings;

each one of said cogeneration plants is linked to other ones of said cogeneration plants by an electrical conductor; and said power management station enables said cogeneration plants to be activated successively and/or alternately such that each of said cogeneration plants can supply electric power to one or more of said buildings based on overall requirements of said block of buildings.

8. A high-powered cogeneration plant adapted for installation in a building, said high-powered cogeneration plant comprising a group of low-powered cogeneration plants linked and interconnected to each other and managed by a power management station, wherein each one of said low-powered cogeneration plants comprises:

a compressor-alternator unit comprising a compressor and an alternator, said compressor-alternator unit being arranged to operate independently, by drawing compressed air supplied by one or more compression stages; and a heating system arranged to heat compressed air from the compressor so as to increase the volume and/or temperature of the compressed air, and arranged to re-inject the compressed air into expansion chambers of master cylinders of said compressor, wherein:
 said heating system comprises a heating unit for the building, said heating unit enabling operation of the compressor;
 said alternator supplies electric power to the building; and each of said low-powered cogeneration plants are arranged to be activated successively, one after another, according to heating requirements of the building.

9. A cogeneration plant according to claim 1, wherein the alternator comprises a flywheel including permanent magnets arranged to travel past electromagnets to produce the electric power.

10. A cogeneration plant according to claim 3, wherein the alternator comprises a flywheel including permanent magnets arranged to travel past electromagnets to produce the electric power.

11. A local network according to claim 4, wherein the alternator comprises a flywheel including permanent magnets arranged to travel past electromagnets to produce the electric power.

12. A local network according to claim 5, wherein the alternator comprises a flywheel including permanent magnets arranged to travel past electromagnets to produce the electric power.

13. A local network according to claim 6, wherein the alternator comprises a flywheel including permanent magnets arranged to travel past electromagnets to produce the electric power.

14. A local network according to claim 7, wherein the alternator comprises a flywheel including permanent magnets arranged to travel past electromagnets to produce the electric power.

15. A high-powered cogeneration plant according to claim 8, wherein the alternator comprises a flywheel including permanent magnets arranged to travel past electromagnets to produce the electric power.

16. A local network according to claim 6, comprising a radio receiving and/or transmitting circuit, said radio receiving and/or transmitting circuit comprising electric or electronic units and a control unit, wherein:

each of said electric or electronic units comprises a radio transceiver, a management and independent dialogue microprocessor and a DC power supply;

said electric or electronic units are arranged to communicate with each other and the control unit via modulated radio waves over a dialogue system radio link established by a conductor interconnecting each of said electric or electronic units and said control unit so as to avoid interference;

each of said electric or electronic units and the control unit are modulated in frequency and have an individual identification code, and a signal to be transmitted by one of said electric or electronic units or the control unit is amplified by an electronic circuit prior to propagation by an antenna to said control unit or other units among said electric or electronic units;

each microprocessor is arranged to construct analog radio signals to be transmitted, analyze received radio signals and construct a digital frame which is decoded so as to obtain various data including:
  the identification code of a transmitting unit and a receiving unit among said electric or electronic units and said control unit;
  an authorization command;
  data and parameters for the digital frame; and
  a key for the digital frame; and
said receiving unit is arranged to carry out a command contained in a received digital frame and send a confirmation message to said transmitting unit through the microprocessor of the receiving unit, and the microprocessor of the receiving unit thereafter constructs a confirmation digital frame which is amplified and then propagated by the antenna of the receiving unit to the transmitting unit and remaining ones of said electric or electronic units.

17. A local network according to claim 7, comprising a radio receiving and/or transmitting circuit, said radio receiving and/or transmitting circuit comprising electric or electronic units and a control unit, wherein:
  each of said electric or electronic units comprises a radio transceiver, a management and independent dialogue microprocessor and a DC power supply;
  said electric or electronic units are arranged to communicate with each other and the control unit via modulated radio waves over a dialogue system radio link established by a conductor interconnecting each of said electric or electronic units and said control unit so as to avoid interference;
  each of said electric or electronic units and the control unit are modulated in frequency and have an individual identification code, and a signal to be transmitted by one of said electric or electronic units or the control unit is amplified by an electronic circuit prior to propagation by an antenna to said control unit or other units among said electric or electronic units;
  each microprocessor is arranged to construct analog radio signals to be transmitted, analyze received radio signals and construct a digital frame which is decoded so as to obtain various data including:
    the identification code of a transmitting unit and a receiving unit among said electric or electronic units and said control unit;
    an authorization command;
    data and parameters for the digital frame; and a key for the digital frame; and
  said receiving unit is arranged to carry out a command contained in a received digital frame and send a confirmation message to said transmitting unit through the microprocessor of the receiving unit, and the microprocessor of the receiving unit thereafter constructs a confirmation digital frame which is amplified and then propagated by the antenna of the receiving unit to the transmitting unit and remaining ones of said electric or electronic units.

\* \* \* \* \*